Feb. 11, 1936.                J. L. SMITH                2,030,550
                    JOINTED POLE FOR TREE PRUNERS
                         Filed Nov. 24, 1933
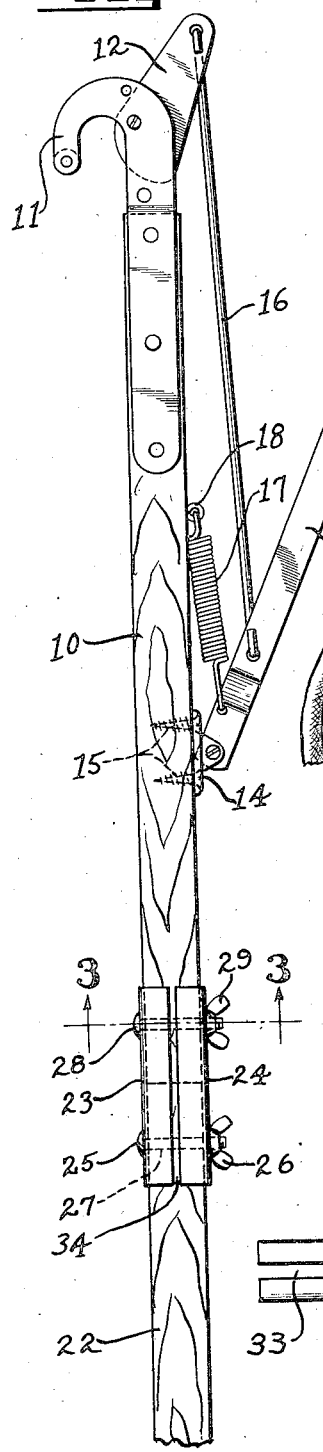
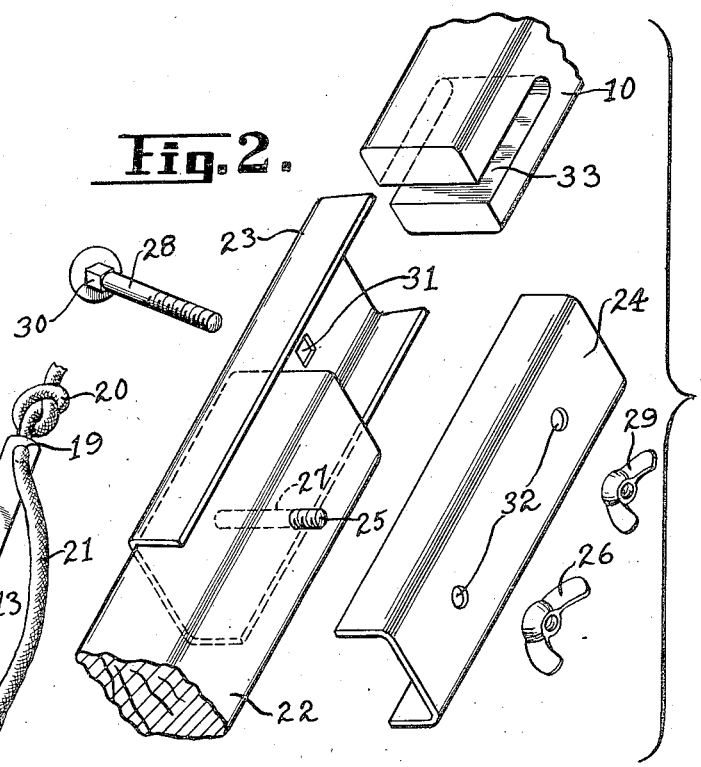
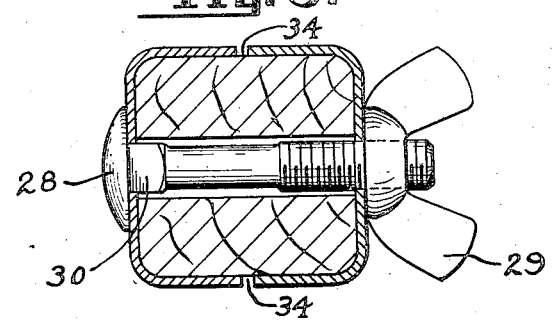
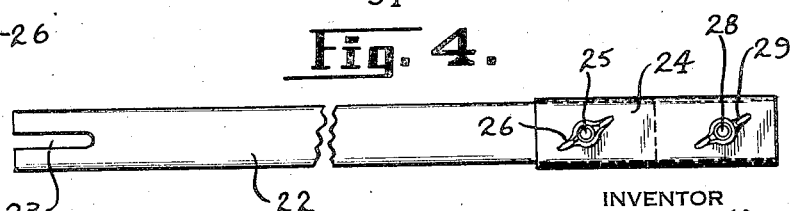
INVENTOR
Justin L. Smith
BY
H. G. Manning
ATTORNEY Patented Feb. 11, 1936

2,030,550

UNITED STATES PATENT OFFICE 2,030,550

JOINTED POLE FOR TREE PRUNERS

Justin L. Smith, Watertown, Conn., assignor to Seymour Smith & Son, Inc., Oakville, Conn., a corporation of Connecticut Application November 24, 1933, Serial No. 699,559

1 Claim. (Cl. 287—111)

This invention relates to pruning tools, and more particularly to a sectional pole for a tree pruning implement.

One object of this invention is to provide a pole of the above nature, the sections of which are interchangeable and readily detachable so that the pole may be easily disassembled and packed in a comparatively small space for convenience in transportation.

A further object is to provide a sectional pole of the above nature in which the joints between the adjacent sections of the pole are formed from a pair of metal channel members adjustably secured in place by bolts and thumb screws, and in which the bottom of each section is slotted to fit over the upper securing bolt of the next section below.

A further object is to provide a device of the above nature which will be simple in construction, inexpensive to manufacture, easy to assemble and manipulate, compact, ornamental in appearance, and very efficient and durable in use.

With these and other objects in view, there has been illustrated on the accompanying drawing, one form in which the invention may be conveniently embodied in practice.

In the drawing:

Fig. 1 is a side view of the upper end of a tree pruner and a portion of one of the extension pole members.

Fig. 2 is an exploded view of one of the joints of said pole.

Fig. 3 is a transverse sectional view of the pole taken along the line 3—3 of Fig. 1, looking upwardly.

Fig. 4 is a side view of one of the pole sections.

Referring now to the drawing in which like reference numerals denote corresponding parts throughout the several views, the numeral 10 indicates the top section of the tree pruner pole which is preferably square in cross-section and has rounded edges. Upon the upper end of the section 10 is secured a bifurcated branch engaging hook 11 within the sides of which is pivotally supported a cutter or knife blade 12. The knife blade 12 is adapted to be operated by means of an elongated lever 13 hingedly connected to a pivoted bracket 14, the latter being secured at an intermediate position upon one of the flat faces of the top pole section 10, as by wood screws 15. A stiff wire link 16 connects the lever 13 at a point near the fulcrum thereof with the outer end of the blade 12.

The lever 13 is normally held in its uppermost inclined position as shown in Fig. 1 by means of a strong coiled spring 17, the lower end of which is secured to the lever 13 between the link 16 and the bracket 14, while the upper end is securely anchored to the handle 10 by means of a screw eye 18. The upper end of the lever 13 is provided with an aperture 19 for receiving the knotted end 20 of a pull cord 21 which is made of sufficient length to hang within convenient reach of the operator's hand. By pulling the cord 21 downwardly, it will be obvious that the lever 13 will swing about the bracket 14 as an axis against the tension of the spring 17 and will actuate the cutting knife 12 for cutting off tree limbs, etc. When the operator releases his hold upon the pull cord 21, the lever and parts connected therewith will be returned to their normal positions shown in Fig. 1.

In order to permit the operation of the tree pruner at heights greater than the length of the upper pole section 10, provision is made of a plurality of interchangeable identical extension handles 22 (only one being shown on the drawing) which may be detachably secured in axial alinement with each other and to said upper section 10 to provide a pole of any desired length. The joint between the upper section 10 and the adjacent handle section 22 is effected by means of a pair of opposed metal semi-tubular channel members 23 and 24, the lower ends of which are detachably secured upon the upper end of the handle section 22 by means of a carriage bolt 25 and a wing nut 26. The carriage bolt 25 is adapted to pass loosely through a transverse hole 27 in the handle 22.

As best shown in Fig. 2, the two channel members are clamped tightly in position upon the handle 22 by means of the carriage bolt 25 and the wing nut 26. A similar carriage bolt 28 is located in the upper part of the channel members 23 and 24, and is also provided with a wing nut 29 on its threaded end. The carriage bolts 25 and 28 are each formed with the usual square-necked portions 30 adjacent the heads thereof which are adapted to fit into corresponding square holes 31 formed in the body of the channel member 23, thus preventing twisting or turning of said bolts. The channel member 24 is provided with a pair of round holes 32 through which the bolts 25 and 28 are adapted to project for receiving the wing nuts 26 and 29.

As shown in Figs. 2 and 4 the lower end of the top section 10 is provided with a transverse slot 33 for embracing the upper bolt 28 and permitting the upper projecting part of the channel members 23 and 24 to telescope over said slotted lower end. In this connection it will be observed that the arrangement of the opposed channel members 23 and 24 is such that their adjacent longitudinal side edges are slightly spaced apart as shown at 34. By means of this construction, when the channels are assembled upon the pole sections, they may be adjusted to fit tightly thereon irrespective of the size of said sections or the amount of wear they have received.

Operation

In the operation of assembling the adjacent sections of the pole, the channel members 23 and 24 will first be positioned in opposed substantially tubular relationship upon the upper end of the lowermost of said adjacent sections, leaving a substantially closed socket extending up beyond the end of said lowermost section. The bolt 25 may then be inserted through the transverse aperture in said lower handle section, and the wing nut 26 screwed up to clamp the lower part of the channels tightly upon said lower section. The bolt 28 will then be placed in position in the hollow socket and will be loosely held in this position by the wing nut 29. The slotted end of the upper pole section will then be pushed down into the open socket formed by the channel members 23 and 24 as far as it will go. The telescopic assembly will then be completed by tightly screwing up the wing nut 29. Additional pole sections may be added as required to produce a pole of any desired length.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention, what is claimed as new and for which it is desired to secure Letters Patent, is:

In a sectional pole, a pair of elongated pole sections arranged end to end, one end of one of said sections having a slot, a split tubular socket mounted on one end of the other pole section and having a hollow section extending therebeyond, a clamping bolt passing through said socket and the body of said unslotted pole section at a point adjacent the end thereof, a second clamping bolt passing through said socket and located in the slot of said slotted pole section, and nuts on said bolts to hold the sides of said tubular socket in tightly clamped position.

JUSTIN L. SMITH.